T. S. MOORE.
BEET HARVESTER.
APPLICATION FILED OCT. 11, 1913.
1,142,048.
Patented June 8, 1915.
2 SHEETS—SHEET 1.
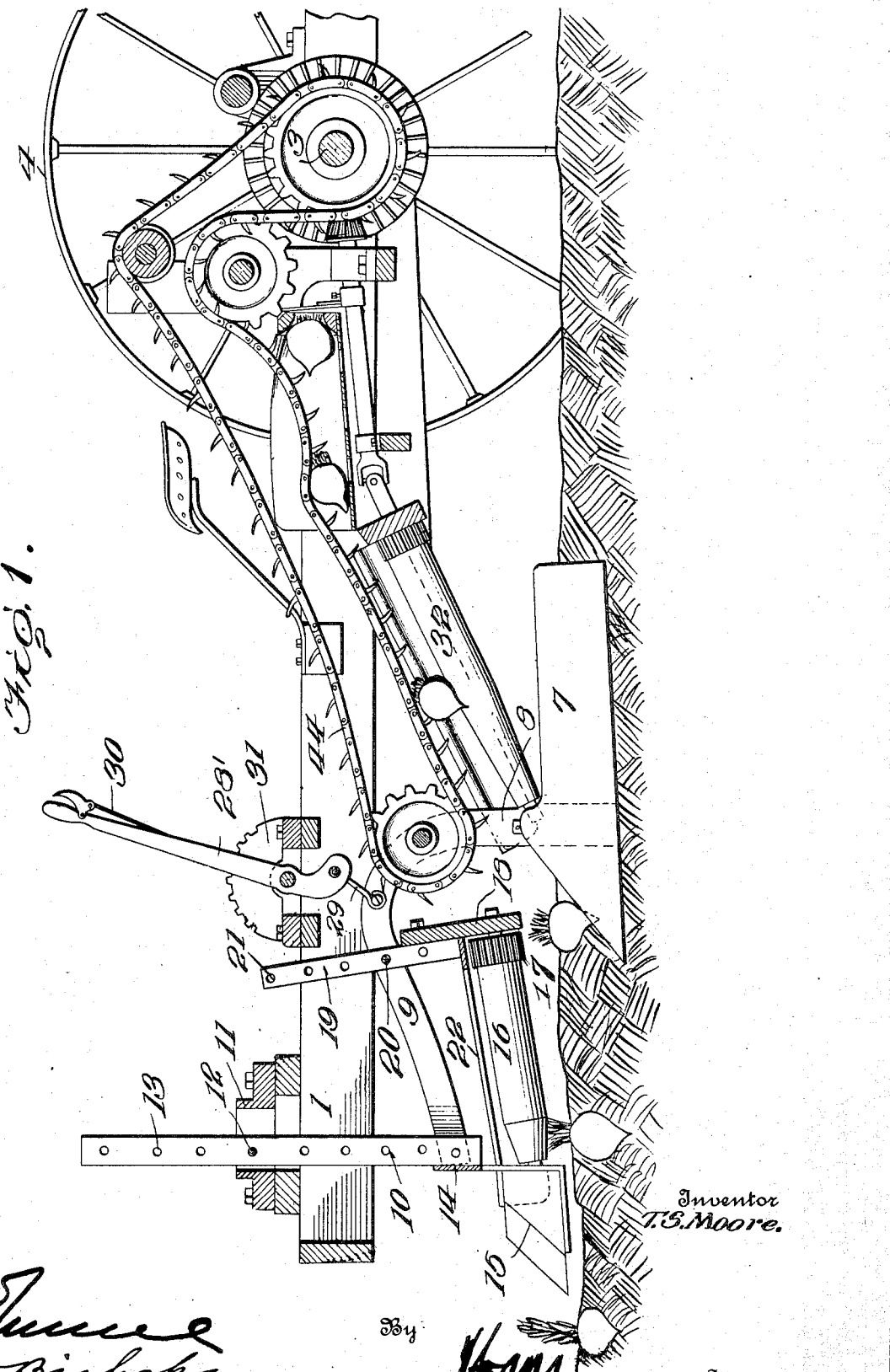

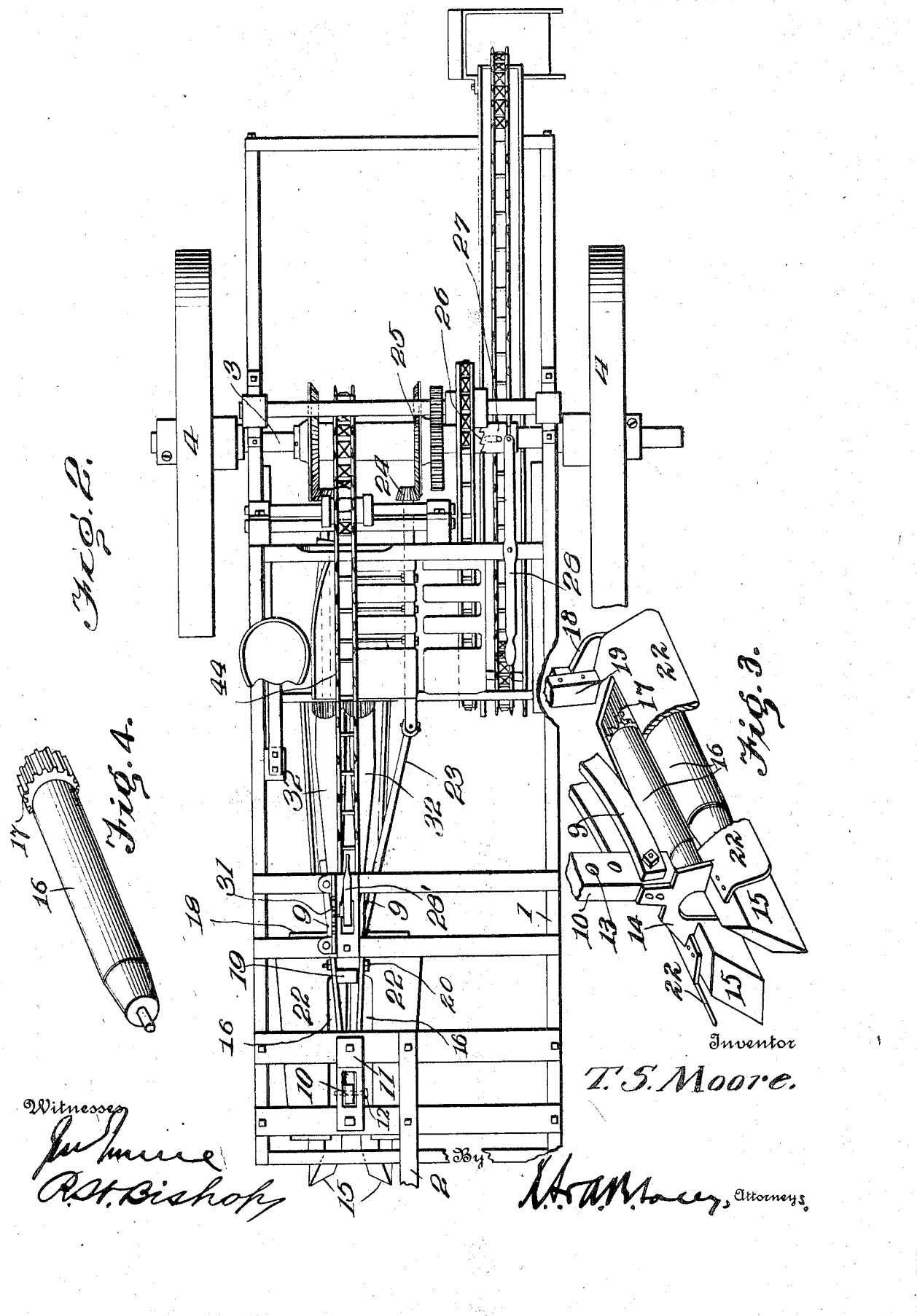

UNITED STATES PATENT OFFICE.

THOMAS S. MOORE, OF SHOSHONI, WYOMING, ASSIGNOR OF ONE-HALF TO MORT WILLIAMS, OF WHEATLAND, WYOMING.

BEET-HARVESTER.

1,142,048.

Specification of Letters Patent.

Patented June 8, 1915.

Application filed October 11, 1913. Serial No. 794,684.

*To all whom it may concern:*

Be it known that I, THOMAS S. MOORE, citizen of the United States, residing at Shoshoni, in the county of Fremont and State of Wyoming, have invented certain new and useful Improvements in Beet-Harvesters, of which the following is a specification.

This invention relates to beet harvesters, and has for its object the provision of a simple and efficient machine which may be drawn over the field and in the course of its travel uproot the beets and withdraw the same from the ground and sever the tops therefrom, the tops being delivered upon the ground at the sides of the row and the beets being conveyed to a receptacle at the rear of the machine.

One object of the invention is to provide novel means whereby the drooping or spreading tops will be bunched so as to be effectually removed from the plants.

Another object of the invention is to provide novel supports for the beet topping and gathering rollers, and a further object of the invention is to improve, generally, the construction and arrangement of the parts of a beet harvesting machine to the end that the efficiency and durability of the same may be increased while the cost of manufacture will be kept upon an economical basis.

Other incidental objects of the invention will appear as the description of the same proceeds, and the invention consists in certain novel features which will be hereinafter first fully described and then more particularly pointed out in the claims following the description.

The invention is illustrated in the accompanying drawings in which:

Figure 1 is a longitudinal vertical section of a beet harvester embodying my present improvements; Fig. 2 is a plan view of the same; Fig. 3 is a detail perspective view of the means for bunching the tops and separating the same from the plants; Fig. 4 is a detail perspective view of one of the gathering and topping rollers.

In carrying out my invention, I employ a frame 1 which may be of any convenient dimensions and of any preferred detailed construction. This frame is equipped at its front end with a draft pole or tongue 2 and in the sides of the frame is journaled an axle 3 upon which are fitted ground wheels 4 adapted to actuate the axle through the well known escapement devices in order that the difference in speed of the two wheels when the machine is turning a corner may be accommodated.

The plows 7, which are designed to run in the ground along the row of plants and at opposite sides of the plants in the row, are secured to and carried by the lower ends of standards 8 which have their upper ends marged into forwardly extending beams 9 and the said beams are secured at their front ends to a hanger 10 which extends upwardly through a slotted bracket or other support 11 secured upon the frame 1 of the machine. This hanger 10 is adjustably secured in the said bracket by a pin 12 inserted through any one of perforations 13 in the hanger and through suitable openings in the sides of the bracket 11, as will be readily understood. The front ends of the beams may thus be adjusted to any desired height and the depth at which the working parts may travel thus regulated. It will be seen at once that this construction provides a very simple means whereby the plows and the gathering and topping rollers may be lowered to act upon the beets, as shown in Fig. 1, or may be raised so as to travel clear of the surface of the ground, when the machine is not to operate and is being drawn from field to field or being taken to a storehouse. To the lower end of the hanger 10 and on the front side thereof I secure a bracket 14 which is in the form of an arch, as shown clearly in Fig. 3, and secured to the lower ends of the said bracket and projecting forwardly therefrom are the deflectors 15 which have their front ends oppositely beveled so that as the said deflectors move forwardly along the row of plants their front beveled ends will take under and lift up the tops of the beets, so that the said tops will be gathered together and pass between the deflectors in a bunch which may be readily and positively engaged by the topping rollers 16. The said topping rollers are disposed longitudinally in rear of the respective deflectors and are provided at their rear ends with intermeshing pinions 17, the said rear ends of the rollers being journaled in a bracket 18 which is secured to a hanger 19 rising between the plow beams 9 and adjustably secured thereto by a pin 20 inserted through one of a series of perforations 21 in the said hanger, as shown and as will be readily understood. The rollers may thus set at any desired angle so as to most effectually perform their intended functions, as experience may dictate. The front ends of the said rollers, which are tapered in order that they may more readily engage the plants and accommodate bodies of different sizes, are journaled in the respective deflectors 15 and extending over each roller and secured to the respective deflector and to the rear hanger 19 and the bracket 18 is a skid 22 which inclines downwardly and outwardly from the adjacent deflector and roller so that the tops pulled from the beets by the said rollers will fall onto the said skids and be thereby delivered upon the ground at the sides of the row. Motion is imparted to the topping rollers 16 through a flexible shaft 23 which has its front end secured to the rear end of one of the rollers and extends substantially longitudinally of the frame with its rear portion journaled in suitable bearings upon cross bars of the frame in advance of the axle. The rear end of the said shaft is equipped with a pinion 24 which meshes with a gear wheel 25 fitted loosely upon the axle and having its hub elongated at one side and constructed with a ratchet or clutch face 26, as shown most clearly in Fig. 2. A coacting clutch member 27 is splined upon the axle and is shiftable longitudinally of the same by means of a lever 28 which is fulcrumed upon the frame in any convenient manner. When the lever is manipulated to disengage the clutch members, the machine may travel without actuating the working mechanism and when it is desired to act upon the plants it is necessary only to shift the clutch member 27 into engagement with the clutch hub 26, whereupon the gear wheel will be actuated.

The plows 7 will, of course, run directly behind the topping rollers 16 and they may be set to take into the ground to any desired depth by manipulating a lever 28' which is fulcrumed upon the frame above the rear ends of the plow beams 9 and is connected with said beams by a link 29, as shown. This lever is equipped with the usual latch or holding member 30 adapted to engage a segment or rack 31 so that the plows will be held in the position in which they may be set. The topped beet bodies are uprooted by the plows 7 and are raised by lifting rollers 32 disposed immediately in rear of the plows so as to be engaged by a conveyer 44 and carried rearwardly so that they may be discharged or gathered in any well known or preferred manner.

It is thought the operation of my improved machine will be readily understood from the foregoing description taken in connection with the accompanying drawings. As the machine is drawn along the row of plants the deflectors 15 will pass under and raise the drooping leaves and stems growing from the tops of the beet bodies or roots and the topping rollers 16 which are immediately in rear of the said deflectors will pass at opposite sides of the bunched tops. Through the train of gearing shown and described, the said rollers 16 will be simultaneously rotated in opposite directions and the adjacent portions of their opposed surfaces will be moving upwardly. These adjacent portions of the said rollers will, consequently, grip the bunched tops of the plants and, as a result, will pull the tops from the plants. After the tops are withdrawn from the beet bodies, their weight will hold them close to the rollers over which they will fall and the continued rotation of the rollers will then feed the tops onto the skids 22 down which they will slide to the ground at the opposite sides of the row.

Changes may be made in the minor details of construction and arrangement of parts without departing from the spirit of the invention as the same is defined in the following claims.

What I claim is:—

1. In a beet harvester, the combination of a supporting frame, plow beams carried thereby, plows secured to said beams, and oppositely rotating parallel beet topping rollers carried by the plow beams in advance of the plows.

2. In a beet harvester, the combination of a supporting frame, plow beams disposed below the front end of the frame, adjustable hangers mounted on the frame and attached to the plow beams, plows carried by the rear ends of said beams, and oppositely rotating parallel beet topping rollers adjustably hung upon the front ends of the plow beams.

3. In a beet harvester, the combination of a main frame, plow beams disposed below the front end of the frame, plows carried by the rear ends of the plow beams, a lever mounted upon the main frame and connected to the rear ends of the plow beams to support the same, a hanger secured to the front ends of the plow beams and adjustably supported upon the main frame, a hanger adjustably secured to the plow beams between the ends thereof, and beet topping rollers hung upon and extending between the said last mentioned hanger and the hanger secured to the front ends of the plow beams.

4. In a beet harvester, the combination of a main frame, plow beams suspended from the front portion of the main frame, plows carried by the rear ends of said beams, a bracket at the front ends of said beams, a hanger adjustably attached to the beams in rear of the front ends thereof, gathering members carried by said bracket and beet topping rollers extending axially between said gathering members and said hanger.

5. In a beet harvester, the combination with a frame, of front and rear brackets suspended therefrom, deflectors secured to and projecting from the front bracket, topping rollers mounted in and extending between the said brackets, means for rotating said rollers simultaneously in opposite directions, and skids extending partly over the said rollers and extending downwardly and outwardly therefrom.

6. In a beet harvester, the combination of a main frame, plow beams suspended therefrom, beet topping rollers carried by the forward portions of the plow beams, plows secured to the rear ends of the plow beams, and means for rotating said rollers simultaneously in opposite directions.

7. In a beet harvester, the combination of a main frame, plow beams suspended from the front end of the main frame, plows carried by the rear ends of said beams, a pair of topping rollers hung upon the forward portions of the plow beams, a flexible shaft disposed longitudinally of the frame and connected to one of said rollers, and means on the frame acting upon the rear end of said shaft to rotate the same.

In testimony whereof I affix my signature in presence of two witnesses.

THOMAS S. MOORE. [L. S.]

Witnesses:
 GARRETT GROOMER,
 E. E. LEWIS.